United States Patent
Webb

(10) Patent No.: US 6,599,693 B1
(45) Date of Patent: Jul. 29, 2003

(54) ARRAY FABRICATION

(75) Inventor: Peter G. Webb, Menlo Park, CA (US)

(73) Assignee: Agilent Technologies Inc., Palo Alto, CA (US)

( * ) Notice: Subject to any disclaimer, the term of this patent is extended or adjusted under 35 U.S.C. 154(b) by 0 days.

(21) Appl. No.: 09/628,963

(22) Filed: Jul. 31, 2000

(51) Int. Cl.⁷ .............................. C12Q 1/00; C12Q 1/68; G01N 33/53; G01N 33/20; G01N 33/543
(52) U.S. Cl. ................................ 435/4; 435/6; 435/7.1; 435/DIG. 49; 436/86; 436/94; 436/518
(58) Field of Search ............................ 422/81; 436/518, 436/43, 63, 86, 94; 530/300; 435/41, 4, 6, 7.1, DIG. 49

(56) References Cited

U.S. PATENT DOCUMENTS

| 5,449,754 A | 9/1995 | Nishioka ..................... 530/334 |
| 5,807,522 A | 9/1998 | Brown et al. .................. 422/50 |
| 5,847,105 A * | 12/1998 | Baldeschwieler .......... 536/25.3 |
| 5,985,356 A * | 11/1999 | Schultz et al. ................. 427/8 |
| 6,121,048 A * | 9/2000 | Zaffaroni et al. ............. 436/45 |
| 6,306,599 B1 * | 10/2001 | Perbost ........................... 436/6 |

FOREIGN PATENT DOCUMENTS

| WO | WO 95/25116 | 9/1995 | ........... C04H/21/00 |
| WO | WO 98/41531 | 9/1998 | |

* cited by examiner

*Primary Examiner*—Andrew Wang
*Assistant Examiner*—Tomas Friend
(74) *Attorney, Agent, or Firm*—Gordon M. Stewart

(57) ABSTRACT

A method of fabricating an array with multiple sets of neighboring features. In the method, for each of multiple sets of neighboring features, at least one set of drops is deposited from a corresponding same pulse jet dispenser onto a substrate so as to form the array with the sets formed from drops deposited by respective different dispensers. Apparatus and computer program products which can execute a method of the invention, are also provided.

19 Claims, 4 Drawing Sheets

ARRAY FABRICATION

FIELD OF THE INVENTION

This invention relates to arrays, particularly polynucleotide arrays such as DNA arrays, which are useful in diagnostic, screening, gene expression analysis, and other applications.

BACKGROUND OF THE INVENTION

Polynucleotide arrays (such as DNA or RNA arrays), are known and are used, for example, as diagnostic or screening tools. Such arrays include regions of usually different sequence polynucleotides arranged in a predetermined configuration on a substrate. These regions (sometimes referenced as "features") are positioned at respective locations ("addresses") on the substrate. The arrays, when exposed to a sample, will exhibit an observed binding pattern. This binding pattern can be detected upon interrogating the array. For example all polynucleotide targets (for example, DNA) in the sample can be labeled with a suitable label (such as a fluorescent compound), and the fluorescence pattern on the array accurately observed following exposure to the sample. Assuming that the different sequence polynucleotides were correctly deposited in accordance with the predetermined configuration, then the observed binding pattern will be indicative of the presence and/or concentration of one or more polynucleotide components of the sample.

Biopolymer arrays can be fabricated by depositing previously obtained biopolymers (such as from synthesis or natural sources) onto a substrate, or by in situ synthesis methods. Methods of depositing obtained biopolymers include dispensing droplets to a substrate from dispensers such as pin or capillaries.(such as described in U.S. Pat. No. 5,807,522) or such as pulse jets (such as a piezoelectric inkjet head, as described in PCT publications WO 95/25116 and WO 98/41531, and elsewhere). For in situ fabrication methods, multiple different reagent droplets are deposited from drop dispensers at a given target location in order to form the final feature (hence a probe of the feature is synthesized on the array stubstrate). The in situ fabrication methods include those described in U.S. Pat. No. 5,449,754 for synthesizing peptide arrays, and described in WO 98/41531 and the references cited therein for polynucleotides. The in situ method for fabricating a polynucleotide array typically follows, at each of the multiple different addresses at which features are to be formed, the same conventional iterative sequence used in forming polynucleotides from nucleoside reagents on a support by means of known chemistry. This iterative sequence is as follows: (a) coupling a selected nucleoside through a phosphite linkage to a functionalized support in the first iteration, or a nucleoside bound to the substrate (i.e. the nucleoside-modified substrate) in subsequent iterations; (b) optionally, but preferably, blocking unreacted hydroxyl groups on the substrate bound nucleoside; (c) oxidizing the phosphite linkage of step (a) to form a phosphate linkage; and (d) removing the protecting group ("deprotection") from the now substrate bound nucleoside coupled in step (a), to generate a reactive site for the next cycle of these steps. The functionalized support (in the first cycle) or deprotected coupled nucleoside (in subsequent cycles) provides a substrate bound moiety with a linking group for forming the phosphite linkage with a next nucleoside to be coupled in step (a). Final deprotection of nucleoside bases can be accomplished using alkaline conditions such as ammonium hydroxide, in a known manner.

The foregoing chemistry of the synthesis of polynucleotides is described in detail, for example, in Caruthers, *Science* 230: 281–285, 1985; Itakura et al., *Ann. Rev. Biochem.* 53: 323–356; Hunkapillar et al., *Nature* 310: 105–110, 1984; and in "Synthesis of Oligonucleotide Derivatives in Design and Targeted Reaction of Oligonucleotide Derivatives", CRC Press, Boca Raton, Fla., pages 100 et seq., U.S. Pat. No. 4,458,066, U.S. Pat. No. 4,500,707, U.S. Pat. No. 5,153,319, U.S. Pat. No. 5,869,643, EP 0294196, and elsewhere In array fabrication, the quantities of polynucleotide available, whether by deposition of previously obtained polynucleotides or by in situ synthesis, are usually very small and expensive. Additionally, sample quantities available for testing are usually also very small and it is therefore desirable to simultaneously test the same sample against a large number of different probes on an array. These conditions require use of arrays with large numbers of very small, closely spaced features. It is important in such arrays that features actually be present, that they are put down accurately in the desired target pattern, are of the correct size, and that the DNA is uniformly coated within the feature. Failure to meet such quality requirements can have serious consequences to diagnostic, screening, gene expression analysis or other purposes for which the array is being used. However, for mass production of arrays with many features, a dispensing system is required which typically has many drop dispensers.

The present invention realizes that one or more of such drop dispensers may suffer from displacement errors. By a "displacement error" is meant a fixed error which results in a drop not being deposited in the expected location. For example, in the case where a head with multiple pulse jet is used, one or more of the jets may dispense droplets in a trajectory which is different from a normal trajectory of other of the jets. An array formed from such a head will have irregular feature spacing making interrogation of the array and/or interpretation of the resulting data more difficult. Further, in the case of large trajectory errors features may undesirably overlap to some extent. While in these situations one could chose not to use those drop dispensers in a head with displacement errors, this reduces the number of dispensers available and hence can increase fabrication time with such a head. Furthermore, this may further require monitoring of dispensers for displacement errors which increases apparatus complexity and data processing requirements during fabrication.

It would be desirable then, to provide a means by of fabricating an array with multiple drop dispensers one or more of which may have a displacement error, while still obtaining arrays with fairly regularly spaced features.

SUMMARY OF THE INVENTION

The present invention then, provides a method of fabricating an array with multiple sets of neighboring features. For each of multiple sets of neighboring features, at least one set of drops is deposited from a corresponding same dispenser onto a substrate. The result of the method is the array in which the feature sets have been formed from drops deposited by respective different dispensers (that is, the features of each set of neighboring features have been deposited by a corresponding same dispenser, with different dispensers having formed different feature sets).

The features may be of any desired moieties, such as polymers (for example, biopolymers such as polynucleotides or peptides). The drops deposited in this case may actually contain the polymers or monomers which are used to sequentially form the polymers. In the particular case where the method uses the in situ method as described above, a set of biomonomer containing drops may be deposited by the same dispenser for each feature of each of the feature sets. Any of the features in the array or within each of multiple feature sets may be of the same or different composition. For example, at least ten of the features in each of multiple feature sets may be of different moieties (such as different biopolymers, for example different biopolymer sequences).

The different dispensers for the repetitions may in one aspect, be moved in unison with respect to the substrate during deposition of respective sets of drops. Such a configuration allows the different dispensers to deposit at least some of the drops of their respective sets on a same pass of the dispensers over the substrate. The dispensers may, for example, be pulse jets (such as piezoelectric or thermoelectric pulse jets as discussed herein).

The number of different dispensers may be at least two, at least five, at least ten, at least twenty, or at least one hundred, while each feature set may have any desired number of features, for example, at least two, at least five, at least ten, at least twenty, at least one hundred or at least one thousand. Each set of neighboring features may include at least four, ten or twenty features in a non-linear configuration (that is, not on a straight line or line of constant curvature). In one particular aspect, the dispensers are operated such that a distance between at least two neighboring sets is greater than a greatest (or alternatively, average) distance separating features within the sets by; for example, at least 5%, at least 10% or at least 25 or 50% (or the foregoing inter-set distance may be at least two times, at least three times, or at least four times, the foregoing inter-feature distance). Both of these distances are measured in a same direction (that is, the distances are measured on a same straight line or parallel straight lines).

The present invention also provides an apparatus for fabricating an array useful in the methods of the above invention. In one aspect the apparatus includes a head system with multiple drop dispensers, a transport system to move the head system with respect to a substrate, and a processor which controls the head and transport system so as to execute any of the methods of the present invention. The apparatus may optionally additionally include a loading station with receptacles to retain multiple different fluids such that the dispensers can be simultaneously brought into contact with respective receptacles for loading the dispensers with the different fluids. Each dispenser in such an apparatus may be constructed so that it holds no more than 100 $\mu$l of a fluid to be dispensed as drops (or no more than 10 $\mu$l or no more than 1 $\mu$l of such fluid). By the dispenser holding a certain volume is referenced the entire dispenser including any reservoir in continuous communication with the remainder of the dispenser. A The present invention further provides a computer program product for use with an apparatus for fabricating an array having multiple drop dispensers and a processor. The computer program product comprises a computer readable storage medium having a computer program stored thereon which, when loaded into the processor, performs the steps of any method of the present invention (by appropriate control of the apparatus).

BRIEF DESCRIPTION OF THE DRAWINGS

Embodiments of the invention will now be described with reference to the drawings, in which.

To facilitate understanding, identical reference numerals have been used, where practical, to designate identical elements that are common to the figures.

DETAILED DESCRIPTION OF EMBODIMENTS OF THE INVENTION

Figure 1:
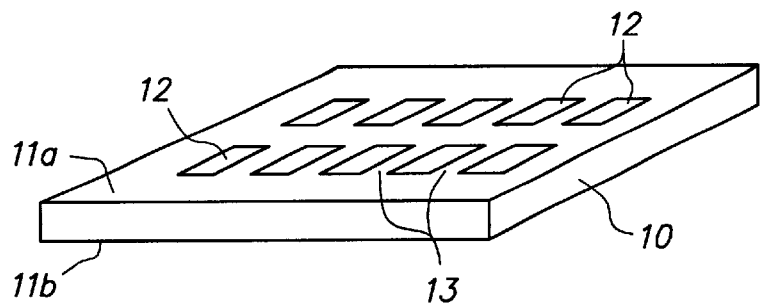
FIG. 1 illustrates a substrate carrying multiple arrays, such as may be fabricated by methods of the present invention.

In the present application, unless a contrary intention appears, the following terms refer to the indicated characteristics. A "biopolymer" is a polymer of one or more types of repeating units. Biopolymers are typically found in biological systems (although they may be made synthetically) and particularly include peptides or polynucleotides, as well as such compounds composed of or containing amino acid analogs or non-amino acid groups, or nucleotide analogs or non-nucleotide groups. This includes polynucleotides in which the conventional backbone has been replaced with a non-naturally occurring or synthetic backbone, and nucleic acids (or synthetic or naturally occurring analogs) in which one or more of the conventional bases has been replaced with a group (natural or synthetic) capable of participating in Watson-Crick type hydrogen bonding interactions. Polynucleotides include single or multiple stranded configurations, where one or more of the strands may or may not be completely aligned with another. A "nucleotide" refers to a sub-unit of a nucleic acid and has a phosphate group, a 5 carbon sugar and a nitrogen containing base, as well as functional analogs (whether synthetic or naturally occurring) of such sub-units which in the polymer form (as a polynucleotide) can hybridize with naturally occurring polynucleotides in a sequence specific manner analogous to that of two naturally occurring polynucleotides. For example, a "biopolymer" includes DNA (including cDNA), RNA, oligonucleotides, and PNA and other polynucleotides as described in U.S. Pat. No. 5,948,902 and references cited therein (all of which are incorporated herein by reference), regardless of the source. An "oligonucleotide" generally refers to a nucleotide multimer of about 10 to 100 nucleotides in length, while a "polynucleotide" includes a nucleotide multimer having any number of nucleotides. A "biomonomer" references a single unit, which can be linked with the same or other biomonomers to form a biopolymer (for example, a single amino acid or nucleotide with two linking groups one or both of which may have removable protecting groups). A "peptide" is used to refer to an amino acid multimer of any length (for example, more than 10, 10 to 100, or more amino acid units). A biomonomer fluid or biopolymer fluid reference a liquid containing either a biomonomer or biopolymer, respectively (typically in solution).

A "set" or "sub-set" of any item (for example, a set of features) contains at least two of the item (for example, at least two features in a feature set. An "array", unless a contrary intention appears, includes any one, two or three dimensional arrangement of addressable regions bearing a particular chemical moiety to moieties (for example, biopolymers such as polynucleotide sequences) associated with that region. An array is "addressable" in that it has multiple regions of different moieties (for example, different polynucleotide sequences) such that a region (a "feature" or "spot" of the array) at a particular predetermined location (an "address") on the array will detect a particular target or class of targets (although a feature may incidentally detect non-targets of that feature). Array features are typically, but need not be, separated by intervening spaces. In the case of an array, the "target" will be referenced as a moiety in a mobile phase (typically fluid), to be detected by probes ("target probes") which are bound to the substrate at the various regions. However, either of the "target" or "target probes" may be the one which is to be evaluated by the other (thus, either one could be an unknown mixture of polynucleotides to be evaluated by binding with the other). An "array layout" refers collectively to one or more characteristics of the features, such as feature positioning, one or more feature dimensions, and some indication of a moiety at a given location. "Hybridizing" and "binding", with respect to polynucleotides, are used interchangeably.

When one item is indicated as being "remote" from another, this is referenced that the two items are at least in different buildings, and may be at least one mile, ten miles, or at least one hundred miles apart. "Communicating" information references transmitting the data representing that information as electrical signals over a suitable communication channel (for example, a private or public network). "Forwarding" an item refers to any means of getting that item from one location to the next, whether by physically transporting that item or otherwise (where that is possible) and includes, at least in the case of data, physically transporting a medium carrying the data or communicating the data.

It will also be appreciated that throughout the present application, that words such as "top", "upper", and "lower" are used in a relative sense only. "Fluid" is used herein to reference a liquid. Reference to a singular item, includes the possibility that there are plural of the same items present. Furthermore, when one thing is "moved", "moving", "repositioned", "scanned", or the like, with respect to another, this implies relative motion only such that either thing or both might actually be moved in relation to the other. For example, when dispensers are "moved" relative to a substrate, either one of the dispensers or substrate may actually be put into motion by the transport system while the other is held still, or both may be put into motion. All patents and other cited references are incorporated into this application by reference.

Figure 2:
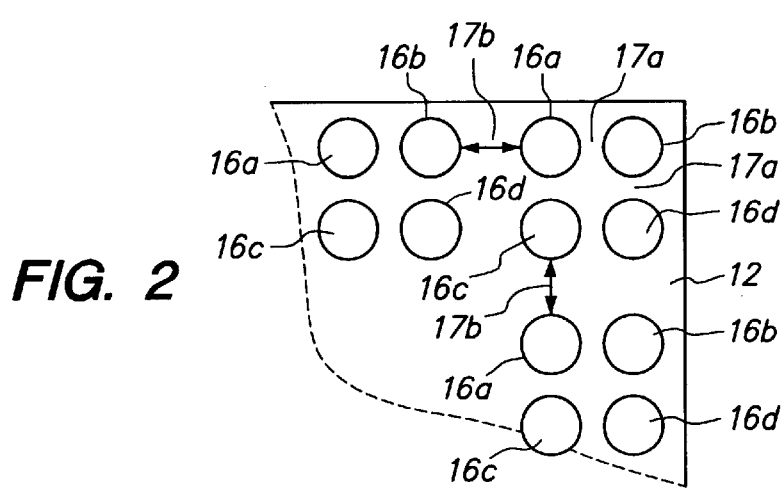
FIG. 2 is an enlarged view of a portion of FIG. 1 showing ideal spots or features.
Figure 3:
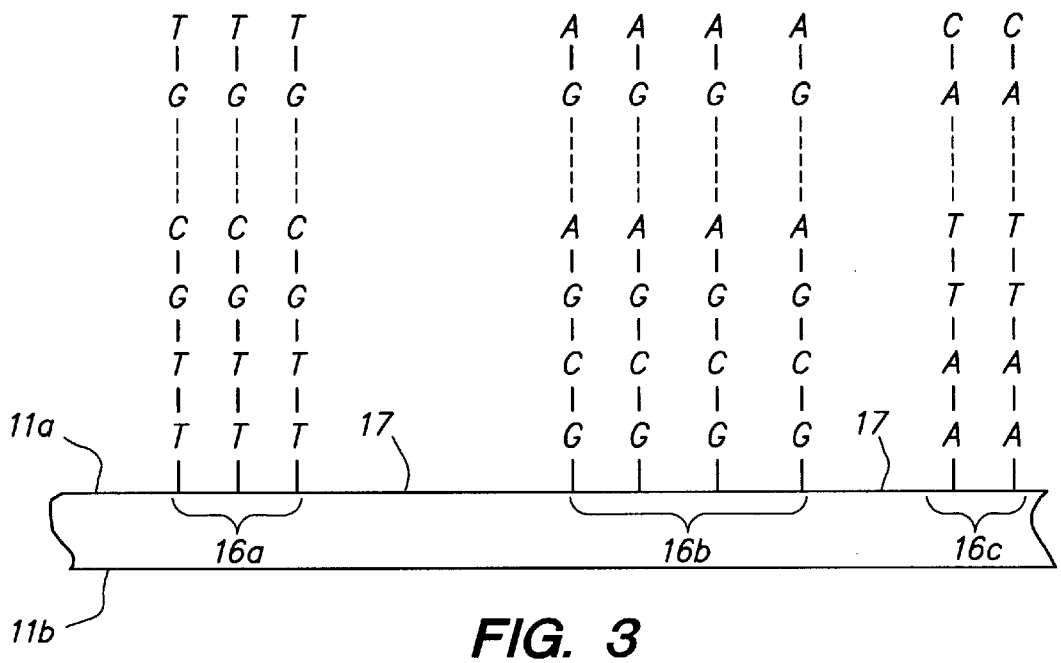
FIG. 3 is an enlarged illustration of a portion of the substrate in FIG. 2.

Referring first to FIGS. 1–3, typically methods and apparatus of the present invention generate or use a contiguous planar substrate 10 carrying one or more arrays 12 disposed across a front surface 11a of substrate 10 and separated by inter-array areas 13. A back side 11b of substrate 10 does not carry any arrays 12. All of the arrays 12 on substrate may be the same or any number or all may be different. Each array 12 can be designed for testing against any type of sample, whether a trial sample, reference sample, a combination of them, or a known mixture of polynucleotides (in which latter case the arrays may be composed of features carrying unknown sequences to be evaluated). While ten arrays 12 are shown in FIG. 2 and the different embodiments described below may use substrates with particular numbers of arrays, it will be understood that substrate 10 and the embodiments to be used with it, may use any number of desired arrays 12. Similarly, substrate 10 may be of any shape, and any apparatus used with it adapted accordingly. Depending upon intended use, any or all of arrays 12 may be the same or different from one another and each will contain multiple spots or features 16 of biopolymers in the form of polynucleotides. A typical array may contain from more than ten, more than one hundred, more than one thousand or ten thousand features, or even more than from one hundred thousand features. All of the features 16 may be different, or some or all could be the same. In the case where arrays 12 are formed by the conventional in situ or deposition of previously obtained moieties, as described above, by depositing for each feature a droplet of reagent in each cycle such as by using a pulse jet such as an inkjet type head, interfeature areas 17 (as represented by the distances 17a or 17b) will typically be present which do not carry any polynucleotide. It will be appreciated though, that the interfeature areas 17 could be of various sizes and configurations. Interfeature distances are typically substantially less than inter-array distances. It will also be appreciated that there need not be any space separating arrays 12 from one another. Each feature carries a predetermined polynucleotide (which includes the possibility of mixtures of polynucleotides). As per usual, A, C, G, T represent the usual nucleotides. It will be understood that there may be a linker molecule (not shown) of any known types between the front surface 11a and the first nucleotide.

As illustrated in FIG. 2 in particular, each array 12 has multiple sets of neighboring features 16a, 16b, 16c, and 16d (only three sets being visible in FIG. 2). All neighboring features within a feature set have the same spacing. Note that the interfeature distance 17b between any two neighboring feature sets is greater than an average distance 17a between features within those two sets (both distances being measured in a same direction, for example the same direction of travel of head 210 with respect to the substrate during drop deposition to form the arrays). It will be understood in this application that "neighboring" feature sets are those which have no other feature set positioned between them. A same definition is used for neighboring features (except "feature set" is replaced with "feature").

For the purposes of the discussions below, it will be assumed (unless the contrary is indicated) that the array being formed in any case is a polynucleotide array formed by the deposition of previously obtained polynucleotides using pulse jet deposition units. However, the applicability of the method to arrays of other polymers or chemical moieties generally, whether formed by multiple cycle in situ methods or deposition of previously obtained moieties, or using other types of dispensers, will be understood from these discussions.

Figure 4:
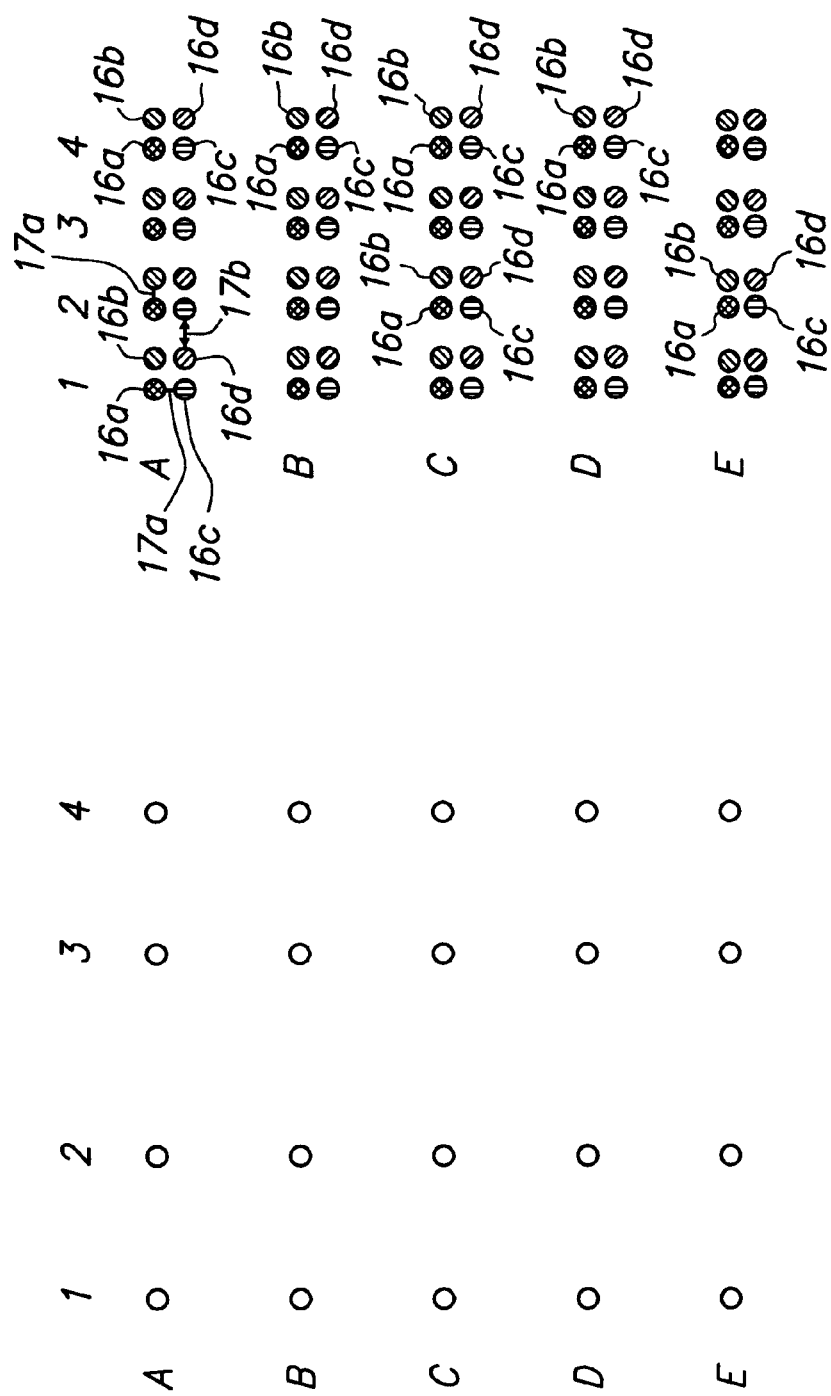
FIG. 4 schematically illustrates an embodiment of a method of the present invention.

Referring to FIG. 4, operation of a method of the present invention is shown to produce at least part of an array 12 illustrated in FIGS. 1–3. FIG. 4 is a view from above looking down (using the orientation of FIG. 5) toward a head system 210 and substrate 10 (not shown in FIG. 4 for clarity) onto which an array is to be fabricated. Head system 210 has two heads 210a and 210b. In FIG. 4 each head 210a and 210b is illustrated with fifteen parallel rows and two columns (all parallel) of dispensers. However, as described below in connection with FIG. 6, each head may in practice have many more rows and columns although the number of rows and columns have been kept low in FIGS. 4 and 5 for the purposes of clarity. Each dispenser is illustrated by its drop dispensing outlet (the drop outlet orifice, for example, in a corresponding pulse jet) represented by a hollow circle in FIG. 4. Deposited droplets are represented by shaded circles (solid black or with a pattern). Since, as described below in connection with FIG. 6, heads 210a and 210b are both mounted to the same head retainer 208, all drop dispensers will be moved in unison by the transport system (see FIG. 6). These drop dispensers are identified as four rows A, B, C, D, and E in FIG. 4, and four columns 1, 2, 3, and 4. In the discussion of FIG. 4 any particular drop dispenser will be referenced by row number followed by column number. For example, drop dispenser A1 refers to the dispenser in row A, column 1, and drop dispenser B2 refers to the drop dispenser in row B, column 2.

In the method, all twenty drop dispensers are typically first loaded with different moieties (such as different polynucleotides) although one or more of the dispensers may be loaded with the same moieties. Head 210 is then moved in multiple passes in the direction of arrow 204a over the same region of substrate 10, and operated so that for each of the multiple sets of neighboring features 16a, 16b, 16c, 16d, a set of drops is deposited from a corresponding same dispenser onto substrate 10 so as to form array 12. In particular, during a first pass of head 210 over substrate 10, each of the dispensers deposits at least one drop for a corresponding feature 16a (which is in the same row/column number as that dispenser). The head may then be reloaded with another twenty moieties (any of which may be the same or different from one another or the moieties previously loaded), and is passed again (second pass) over substrate 10 so that each of the dispensers deposits at least one drop for a corresponding feature 16b (which is in the same row/column number as that dispenser). The foregoing procedure is repeated two more times so that drops have been deposited at all four features 16a, 16b, 16c, 16d of each feature set. Note that the result of this process is that the feature sets are formed from drops deposited by respective different dispensers. That is, the feature set (which consists of features 16a, 16b, 16c, 16d) at region A1, has been formed only by dispenser A1. Similarly, the feature set at region B2 has been formed only by dispenser B2, and so on.

Note that in the methods of FIG. 4, the columns of deposited droplets 1–4 are spaced closer together than the columns 1–4 of respective dispensers (the dispensed drop columns are "compressed" relative to the respective dispensers). This decrease in deposited drop spacing in a direction of travel of the head system, is readily obtained with pulse jet dispensers by processor 140 correctly timing dispenser actuation as head system 210 moves over the substrate. Such compression allows for arrays with deposited drop spacing as measured in the direction of head travel, to be independent of the spacing of the respective dispensers which deposited them.

Figure 5A:
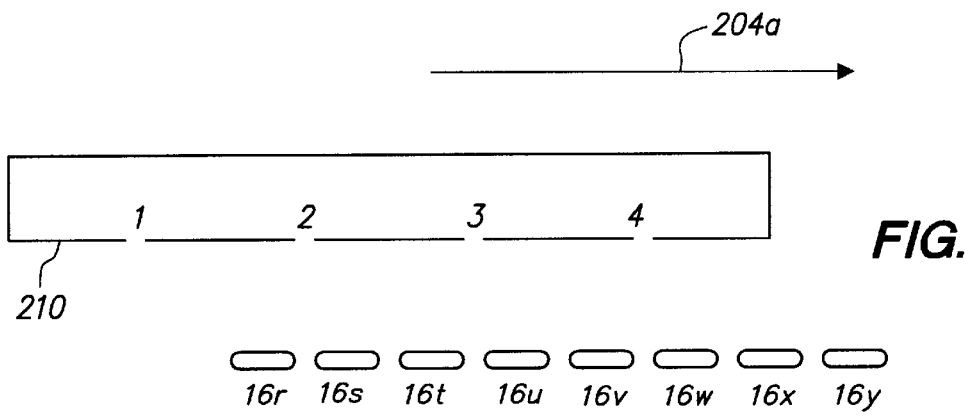
FIG. 5 illustrates how the a method of the present invention can reduce feature overlap compared to alternative drop deposition procedures (only FIG. 5C of FIG. 5 shows the result of a method of the present invention)
Figure 5B:
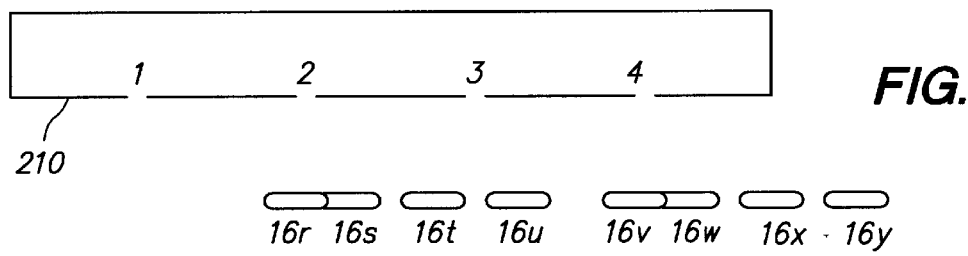
Figure 5C:
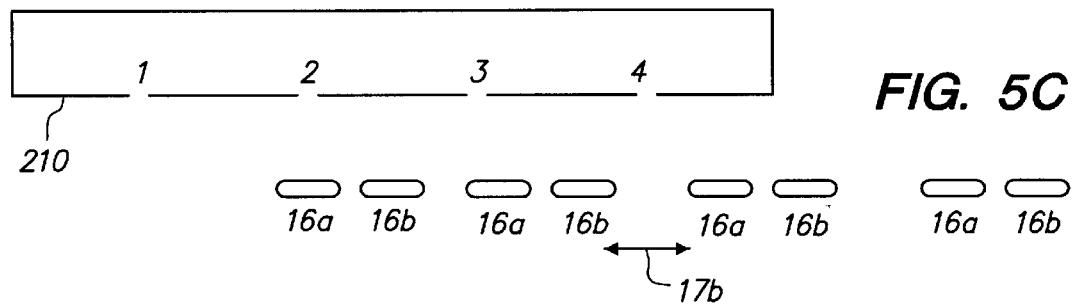

Using the foregoing procedure can reduce the chances of drop overlap where a particular pulse jet may have a displacement error. This is illustrated, for example, in FIG. 5 Only FIG. 5C in FIG. 5 illustrates the result of a method of the present invention. FIG. 5A illustrates a simple ideal scheme to deposit drops at eight features 16r through 16y, to form part of a single line of an array. In particular, in FIG. 5A during a first pass of head 210 over the substrate in the direction 204a, as each of dispenser 4, 3, 2, 1 respectively pass over feature positions 16u, 16t, 16s, 16r a droplet is dispensed. In this procedure all features 16r to 16s may be equally spaced from one another. The same procedure is followed for droplets at features 16y, 16x, 16v, 16w during a second pass after re-loading of the head (or during the same pass if re-loading is not required). However, as illustrated in FIG. 5B, if dispenser 1 should suffer a displacement error such that its droplet trajectory is to the right (as viewed in FIG. 5B) of where it is expected, features 16r and 16s will overlap (as will features 16v and 16w). Using the method of FIG. 5C though (as described in connection with FIG. 4), viewed from the left in FIG. 5C the first set of features 16a, 16b were all deposited by dispenser 1, while the second set of features 16a, 16b were all deposited by dispenser 2, and so on. Thus, although dispenser 1 has a displacement error there will not be any feature overlap (although the spacing between the first and second feature sets, is somewhat less than the spacing between other feature sets). To reduce the chances that features of one feature set might overlap with features of another set due to dispenser displacement errors in different directions, the method is executed so that a greater nominal distance is left between neighboring feature sets than the nominal distance between neighboring features within those sets. The relative size of this greater distance is discussed above. While this may result in an array of the present method taking up slightly more area than if a method such as that of FIG. 5A could be used, this additional area requirement is actually very much smaller than might be suggested by FIGS. 4 and 5C (which, like the rest of the FIGS., are not to scale).

Figure 6:
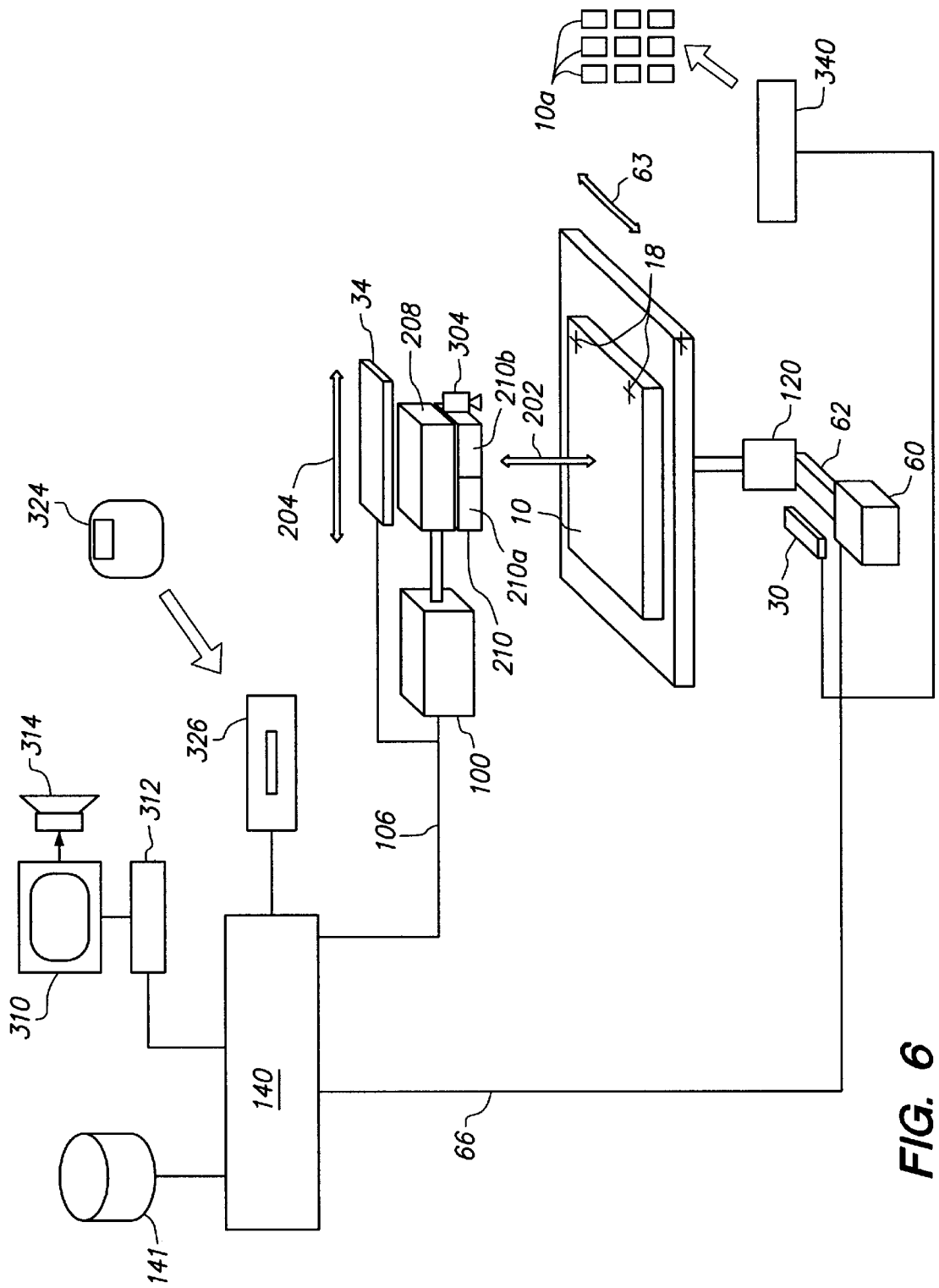
FIG. 6 is an apparatus of the present invention.

Referring to FIG. 6 an apparatus of the present invention includes a substrate station 20 on which can be mounted a substrate 10. Pins or similar means (not shown) can be provided on substrate station 20 by which to approximately align substrate 10 to a nominal position thereon. Substrate station 20 can include a vacuum chuck connected to a suitable vacuum source (not shown) to retain a substrate 10 without exerting too much pressure thereon, since substrate 10 is often made of glass.

A dispensing head system 210 is retained by a head retainer 208. Head system 210 can be positioned at any position facing substrate 10 by means of a transport system. The transport system includes a carriage 62 connected to a first transporter 60 controlled by processor 140 through line 66, and a second transporter 100 controlled by processor 140 through line 106. Transporter 60 and carriage 62 are used execute one axis positioning of station 20 (and hence mounted substrate 10) facing the dispensing head system 210, by moving it in the direction of nominal axis 63, while transporter 100 is used to provide adjustment of the position of head retainer 208 in a direction of nominal axis 204 (and hence move the rows of dispensers as described in connection with FIGS. 4 and 5). In this manner, head system 210 can be scanned line by line, by scanning along a line over substrate 10 in the direction of axis 204 using transporter 100, while line by line movement of substrate 10 in a direction of axis 63 is provided by transporter 60. Head system 210 may also optionally be moved in a vertical direction 202, by another suitable transporter (not shown). However, it will be appreciated that other scanning configurations could be used. However, it will be appreciated that both transporters 60 and 100, or either one of them, with suitable construction, could be used to perform the foregoing scanning of head system 210 with respect to substrate 10. Thus, when the present application refers to "positioning" one element (such as head system 210) in relation to another element (such as one of the stations 20 or substrate 10) it will be understood that any required moving can be accomplished by moving either element or a combination of both of them. An encoder 30 communicates with processor 140 to provide data on the exact location of substrate station 20 (and hence substrate 10 if positioned correctly on substrate station 20), while encoder 34 provides data on the exact location of holder 208 (and hence head system 210 if positioned correctly on holder 208). Any suitable encoder, such as an optical encoder, may be used which provides data on linear position. Angular positioning of substrate station 20 is provided by a transporter 120, which can rotate substrate station 20 about axis 202 under control of processor 140. Typically, substrate station 20 (and hence a mounted substrate) is rotated by transporter 120 under control of processor 140 in response to an observed angular position of substrate 10 as determined by processor 140 through viewing one or more fiducial marks on substrate 10 (particularly fiducial marks 18) with a camera (not shown). This rotation will continue until substrate 10 has reached a predetermined angular relationship with respect to dispensing head system 210. In the case of a square or rectangular substrate, the mounted substrate 10 will typically be rotated to align one edge (length or width) with the scan direction of head system 210 along axis 204.

Head system 210 may contain one or more (for example, two) heads mounted on the same head retainer 208. Each such head may be of a type commonly used in an ink jet type of printer and may, for example, have one hundred fifty drop dispensing orifices in each of two parallel rows, six chambers for holding polynucleotide solution communicating with the three hundred orifices, and three hundred ejectors which are positioned in the chambers opposite a corresponding orifice. Each ejector is in the form of an electrical resistor operating as a heating element under control of processor 140 (although piezoelectric elements could be used instead). Each orifice with its associated ejector and portion of the chamber, defines a corresponding pulse jet with the orifice acting as a nozzle. Thus, there are three hundred pulse jets in this configuration, although it will be appreciated that head system 210 could, for example, have more or less pulse jets as desired (for example, at least ten or at least one hundred pulse jets). In this manner, application of a single electric pulse to an ejector causes a droplet to be dispensed from a corresponding orifice. In the foregoing configuration, typically about twenty orifices in each group of six reservoirs (many of the orifices are unused and are plugged with glue), will be dispensing the same fluid. Thus, each "series" in such a configuration has twenty dispensers. Certain elements of each head can be adapted from parts of a commercially available thermal inkjet print head device available from Hewlett-Packard Co. as part no. HP51645A. The foregoing head system 210 and other suitable dispensing head designs are described in more detail in U.S. patent application entitled "A MULTIPLE RESERVOIR INK JET DEVICE FOR THE FABRICATION OF BIOMOLECULAR ARRAYS" Serial No. 09/150,507 filed Sep. 9, 1998 now Pat. No. 6,461,812, incorporated herein by reference. However, other head system configurations can be used.

As is well known in the ink jet print art, the amount of fluid that is expelled in a single activation event of a pulse jet, can be controlled by changing one or more of a number of parameters, including the orifice diameter, the orifice length (thickness of the orifice member at the orifice), the size of the deposition chamber, and the size of the heating element, among others. The amount of fluid that is expelled during a single activation event is generally in the range about 0.1 to 1000 pL, usually about 0.5 to 500 pL and more usually about 1.0 to 250 pL. A typical velocity at which the fluid is expelled from the chamber is more than about 1 m/s, usually more than about 10 m/s, and may be as great as about 20 m/s or greater. As will be appreciated, if the orifice is in motion with respect to the receiving surface at the time an ejector is activated, the actual site of deposition of the material will not be the location that is at the moment of activation in a line-of-sight relation to the orifice, but will be a location that is predictable for the given distances and velocities.

The sizes of the features can have widths (that is, diameter, for a round spot) in the range from a minimum of about 10 $\mu$m to a maximum of about 1.0 cm. In embodiments where very small spot sizes or feature sizes are desired, material can be deposited according to the invention in small spots whose width is in the range about 1.0 $\mu$m to 1.0 mm, usually about 5.0 $\mu$m to 500 $\mu$m, and more usually about 10 $\mu$m to 200 $\mu$m. Spot sizes can be adjusted as desired, by using one or a desired number of pulses from a pulse jet to provide the desired final spot size.

Multiple pulse jets of head 210 can be simultaneously loaded through orifices of the pulse jets at a loading station (not shown). The loading station may have multiple receptacles to retain multiple different fluids such that the dispensers can be simultaneously brought into contact with respective receptacles for loading the dispensers with the different fluids. Such a loading station may include a flexible microtitre plate as described in U.S. patent application "Method and Apparatus for Liquid Transfer", Ser. No. 09/183,604. The transport system can move head 210 to such a loading station, as required.

The apparatus optionally may optionally include a sensor in the form of a camera 304, to monitor for other errors (such as failure to dispense droplets) by monitoring for drops dispensed onto substrate 10 when required of a dispenser. Camera 304 communicates with processor 140, and should have a resolution that provides a pixel size of about 1 to 100 micrometers and more typically about 4 to 20 micrometers or even 1 to 5 micrometers. Any suitable analog or digital image capture device (including a line by line scanner) can be used for such camera, although if an analog camera is used processor 140 should include a suitable analog/digital converter. A detailed arrangement and use of such a camera to monitor for dispenser errors, is described in U.S. patent application Ser. No. 09/419447 U.S. Pat. No. 6,232,072 entitled "Biopolymer Array Inspection" by William D. Fisher. Particular observations techniques are described, for example, in co-pending U.S. patent application Ser. No. 09/302,898 filed Apr. 30, 1999 by Caren et al., assigned to the same assignee as the present application, incorporated herein by reference. Alternatively, the sensor can be a drop detector which detects an electrical charge on a dispensed drop, in accordance with the apparatus and methods described in U.S. Ser. No. 09/558,532 entitled "Array Fabrication with Drop Detection" filed by Christopher A. Schantz et al. Monitoring can occur during formation of an array and the information used during fabrication of the remainder of that array or another array, or test-print patterns can be run before array fabrication.

A display 310, speaker 314, and operator input device 312, are further provided. Operator input device 312 may, for example, be a keyboard, mouse, or the like. Processor 140 has access to a memory 141, and controls print head system 210 (specifically, the activation of the ejectors therein), operation of the transport system, operation of each jet in print head system 210, capture and evaluation of images from the camera 304, and operation display 310 and speaker 314. Memory 141 may be any suitable device in which processor 140 can store and retrieve data, such as magnetic, optical, or solid state storage devices (including magnetic or optical disks or tape or RAM, or any other suitable device, either fixed or portable). Processor 140 may include a general purpose digital microprocessor suitably programmed from a computer readable medium carrying necessary program code, to execute all of the functions required of it as described below. It will be appreciated though, that when a "processor" such as processor 140 is referenced throughout this application, that such includes any hardware and/or software combination which will perform the required functions. Suitable programming can be provided remotely to processor 140, or previously saved in a computer program product such as memory 141 or some other portable or fixed computer readable storage medium using any of those devices mentioned below in connection with memory 141. For example, a magnetic or optical disk 324 may carry the programming, and can be read by disk reader 326. A cutter 340 is provided which under control of processor 140 can separate substrate 10 by cutting it, into multiple equal sized substrate segments 10a each carrying at least one array 12.

Operation of the apparatus of FIG. 6 in accordance with a method of the present invention, will now be described. First, it will be assumed that memory 141 holds a target drive pattern. This target drive pattern is the instructions for driving the apparatus components as required to form the target array (which includes target locations and dimension for each spot) on substrate 10 and includes, for example, movement commands to transporters 60 and 100 as well as firing commands for each of the pulse jets in head system 210 co-ordinated with the movement of head system 210 and substrate 10, as well as instructions for which polynucleotide solution (or precursor) is to be loaded in each pulse jet (that is, the "loading pattern"). This target drive pattern is based upon the target array pattern and can have either been input from an appropriate source (such as input device 312, a portable magnetic or optical medium, or from a remote server, any of which communicate with processor 140), or may have been determined by processor 140 based upon an input target array pattern (using any of the appropriate sources previously mentioned) and the previously known nominal operating parameters of the apparatus. Further, it will be assumed that drops of different biomonomer or biopolymer containing fluids (or other fluids) have been placed at respective regions of a loading station (not shown). Operation of the following sequences are controlled by processor 140, following initial operator activation, unless a contrary indication appears.

For any given substrate 10, the operation of the present method is basically follows. A target drive pattern is determined (if not already provided) to obtain a target array pattern, based on nominal operating parameters and target polynucleotide array pattern. The target array pattern may include the possibility of multiple arrays 12 on the same substrate 10, as discussed above in connection with FIGS. 1–3, and includes the forming of sets of neighboring features in the manner already described above. The apparatus is then operated as follows: (a) load head system 210 with a first set of polynucleotide containing solutions or their precursors; (b) dispense droplets from head system 210 onto substrate 10 or multiple different substrates 10, in accordance with at least a portion of the target drive pattern; and (c) reload head 210 at the loading station and repeat steps (a) and (b) as necessary until drops of all required solutions have been dispensed onto substrate 10 so as to form the one or more arrays 12. It will be appreciated though, that techniques of this application or the two applications (incorporated herein by reference) entitled "Array Fabrication" by Peter Webb filed the same date as the present application and both assigned to Agilent Technologies, Inc. may be combined as appropriate.

A loading sequence for head system 210 is more completely described in co-pending patent applications "FABRICATING BIOPOLYMER ARRAYS", by Caren et al., Ser. No. 09/302,922 U.S. Pat. No. 6,323,043, and "PREPARATION OF BIOPOLYMER ARRAYS" by A. Schleifer et al., Ser. No. 09/302,899 U.S. Pat. No. 6,242,266, both filed Apr. 30, 1999 and both assigned to the same assignee as the present application, and the references cited therein, including the possibility of using a flexible microtitre plate as mentioned above. Those references and all other references cited in the present application, are incorporated into this application by reference. Processor 140 can control pressure within head system 210 to load each polynucleotide solution into the chambers in the head by drawing it through the orifices as described in one or more of the foregoing applications.

Substrate 10 is loaded onto substrate station 20 either manually by an operator, or optionally by a suitable automated driver (not shown) controlled, for example, by processor 140.

The deposition sequence is then initiated to deposit the desired arrays of polynucleotide containing fluid droplets on the substrate according to the target pattern to form the arrays each with respective feature locations and dimensions. As already mentioned, in this sequence processor 140 will operate the apparatus according to the target drive pattern, by causing the transport system to position head system 210 facing substrate station 20, and particularly the mounted substrate 10, and with head system 210 at an appropriate distance from substrate 10. Processor 140 then causes the transport system to scan head system 210 across substrate 10 line by line (or in some other desired pattern), while coordinating activation of the ejectors in head system 210 so as to dispense droplets as described above. As already mentioned, if necessary or desired, processor 140 can repeat the loading and dispensing sequences one or more times until head system 210 has dispensed droplets to obtain the target arrays 12 on substrate 10. The number of spots in any one array 12 can, for example, be at least ten, at least one hundred, at least one thousand, or even at least one hundred thousand.

At this point the droplet dispensing sequence is complete. Substrate 10 can then be sent to cutter 340 and cut into separate segments 10a, each carrying at least one array 12.

When a user receives an array made by an apparatus or method of the present invention, it will typically be exposed to a sample and the array interrogated following exposure. Interrogation is usually accomplished by a suitable scanner which can read the location and intensity of fluorescence at each feature of an array following exposure to a fluorescently labeled sample (such as a polynucleotide containing sample). For example, such a scanner may be similar to the GENEARRAY scanner available from Hewlett-Packard, Palo Alto, Calif. Results from the interrogation can be processed such as by rejecting a reading for a feature which is below a predetermined threshold and/or forming conclusions based on the pattern read from the array (such as whether or not a particular target sequence may have been present in the sample). The results of the interrogation or processing can be forwarded (such as by communication) to a remote location if desired, for further use.

The present methods and apparatus may be used to deposit biopolymers or other chemical moieties on surfaces of any of a variety of different substrates, including both flexible and rigid substrates. Preferred materials provide physical support for the deposited material and endure the conditions of the deposition process and of any subsequent treatment or handling or processing that may be encountered in the use of the particular array. The array substrate may take any of a variety of configurations ranging from simple to complex. Thus, the substrate could have generally planar form, as for example a slide or plate configuration, such as a rectangular or square or disc. In many embodiments, the substrate will be shaped generally as a rectangular solid, having a length in the range about 4 mm to 1 m, usually about 4 mm to 600 mm, more usually about 4 mm to 400 mm; a width in the range about 4 mm to 1 m, usually about 4 mm to 500 mm and more usually about 4 mm to 400 mm; and a thickness in the range about 0.01 mm to 5.0 mm, usually from about 0.1 mm to 2 mm and more usually from about 0.2 to 1 mm. However, larger substrates can be used, particularly when such are cut after fabrication into smaller size substrates carrying a smaller total number of arrays 12.

In the present invention, any of a variety of geometries of arrays on a substrate 10 may be fabricated other than the rectilinear rows and columns of arrays 12 of FIG. 1. For example, arrays 12 can be arranged in a sequence of curvilinear rows across the substrate surface (for example, a sequence of concentric circles or semi-circles of spots), and the like. Similarly, the pattern of features 16 may be varied from the rectilinear rows and columns of spots in FIG. 2 to include, for example, a sequence of curvilinear rows across the substrate surface (for example, a sequence of concentric circles or semi-circles of spots), and the like. In such cases, the arrangement of dispensers in head system 210 may be altered accordingly. The configuration of the arrays and their features may be selected according to manufacturing, handling, and use considerations.

The substrates may be fabricated from any of a variety of materials. In certain embodiments, such as for example where production of binding pair arrays for use in research and related applications is desired, the materials from which the substrate may be fabricated should ideally exhibit a low level of non-specific binding during hybridization events. In many situations, it will also be preferable to employ a material that is transparent to visible and/or UV light. For flexible substrates, materials of interest include: nylon, both modified and unmodified, nitrocellulose, polypropylene, and the like, where a nylon membrane, as well as derivatives thereof, may be particularly useful in this embodiment. For rigid substrates, specific materials of interest include: glass; plastics (for example, polytetrafluoroethylene, polypropylene, polystyrene, polycarbonate, and blends thereof, and the like); metals (for example, gold, platinum, and the like).

The substrate surface onto which the polynucleotide compositions or other moieties is deposited may be smooth or substantially planar, or have irregularities, such as depressions or elevations. The surface may be modified with one or more different layers of compounds that serve to modify the properties of the surface in a desirable manner. Such modification layers, when present, will generally range in thickness from a monomolecular thickness to about 1 mm, usually from a monomolecular thickness to about 0.1 mm and more usually from a monomolecular thickness to about 0.001 mm. Modification layers of interest include: inorganic and organic layers such as metals, metal oxides, polymers, small organic molecules and the like. Polymeric layers of interest include layers of: peptides, proteins, polynucleic acids or mimetics thereof (for example, peptide nucleic acids and the like); polysaccharides, phospholipids, polyurethanes, polyesters, polycarbonates, polyureas, polyamides, polyethyleneamines, polyarylene sulfides, polysiloxanes, polyimides, polyacetates, and the like, where the polymers may be hetero- or homopolymeric, and may or may not have separate functional moieties attached thereto (for example, conjugated).

Various further modifications to the particular embodiments described above are, of course, possible. Accordingly, the present invention is not limited to the particular embodiments described in detail above.

What is claimed is:

1. A method of fabricating an array with multiple sets of neighboring features comprising, for each of multiple sets of neighboring features, depositing at least one set of drops from a same corresponding pulse jet dispenser onto a substrate, at least some drops in a set of drops containing different biopolymers from one another, so as to form the array with different sets of features formed from drops deposited by respective different dispensers, the features of each same set being formed by drops deposited by a same dispenser.

2. A method according to claim 1 wherein the different dispensers are moved in unison with respect to the substrate during deposition of respective sets of drops from the different dispensers.

3. A method according to claim 2 wherein the different dispensers deposit one or more of the drops of their respective sets on a same pass over the substrate.

4. A method according to claim 1 wherein each feature set has at least ten features with ten different biopolymers.

5. A method according to claim 1 wherein features within each of multiple feature sets comprise polynucleotides or peptides.

6. A method according to claim 5 wherein features within each of multiple feature sets comprise polynucleotides.

7. A method according to claim 5 wherein features within each of multiple feature sets comprise peptides.

8. A method according to claim 1 wherein at least ten different dispensers are used.

9. A method according to claim 1 wherein each set of neighboring features includes at least four features in a non-linear configuration.

10. A method according to claim 1 wherein a distance between at least two neighboring sets is greater than an average distance between features within the sets, both as measured in a same direction.

11. A method of fabricating multiple arrays, comprising fabricating the arrays on a same substrate each according to claim 1, the method additionally comprising separating the substrate into multiple segments each carrying at least one of the arrays.

12. A method according to claim 1 wherein the distance between at least two neighboring sets of features is no greater than 2 mm.

13. A method according to claim 1 wherein the sets of features are formed from drops deposited by respective different dispensers on a same deposition head.

14. A method according to claim 13 wherein the deposition head has at least ten dispensers.

15. A method according to claim 13 wherein the deposition head has at least twenty different dispensers.

16. A method according to claim 1 wherein the sets of features are formed from drops deposited by respective ones of at least ten dispensers on a same deposition head, which different dispensers of the same head comprise different orifices on a same one-piece member.

17. A method according to claim 1 wherein the sets of features are formed from drops deposited by respective ones of at least twenty dispensers on a same deposition head, which different dispensers of the same head comprise different orifices on a same one-piece member.

18. A method according to claim 1 wherein the sets of features are formed from drops deposited by respective ones of at least one hundred dispensers on a same deposition head, which different dispensers of the same head comprise different orifices on a same one-piece member.

19. A method of fabricating an array with multiple sets of neighboring features comprising, for each of multiple sets of neighboring features, depositing at least one set of drops from a same corresponding dispenser onto a substrate, at least some drops in a set of drops containing different biopolymers from one another, so as to form the array with different sets of features formed from drops deposited by respective different dispensers, the features of each same set being formed by drops deposited by a same dispenser, wherein a distance between at least two neighboring sets of features is greater than an average distance between features within the sets, both as measured in a same direction.

* * * * *